Figure 1:
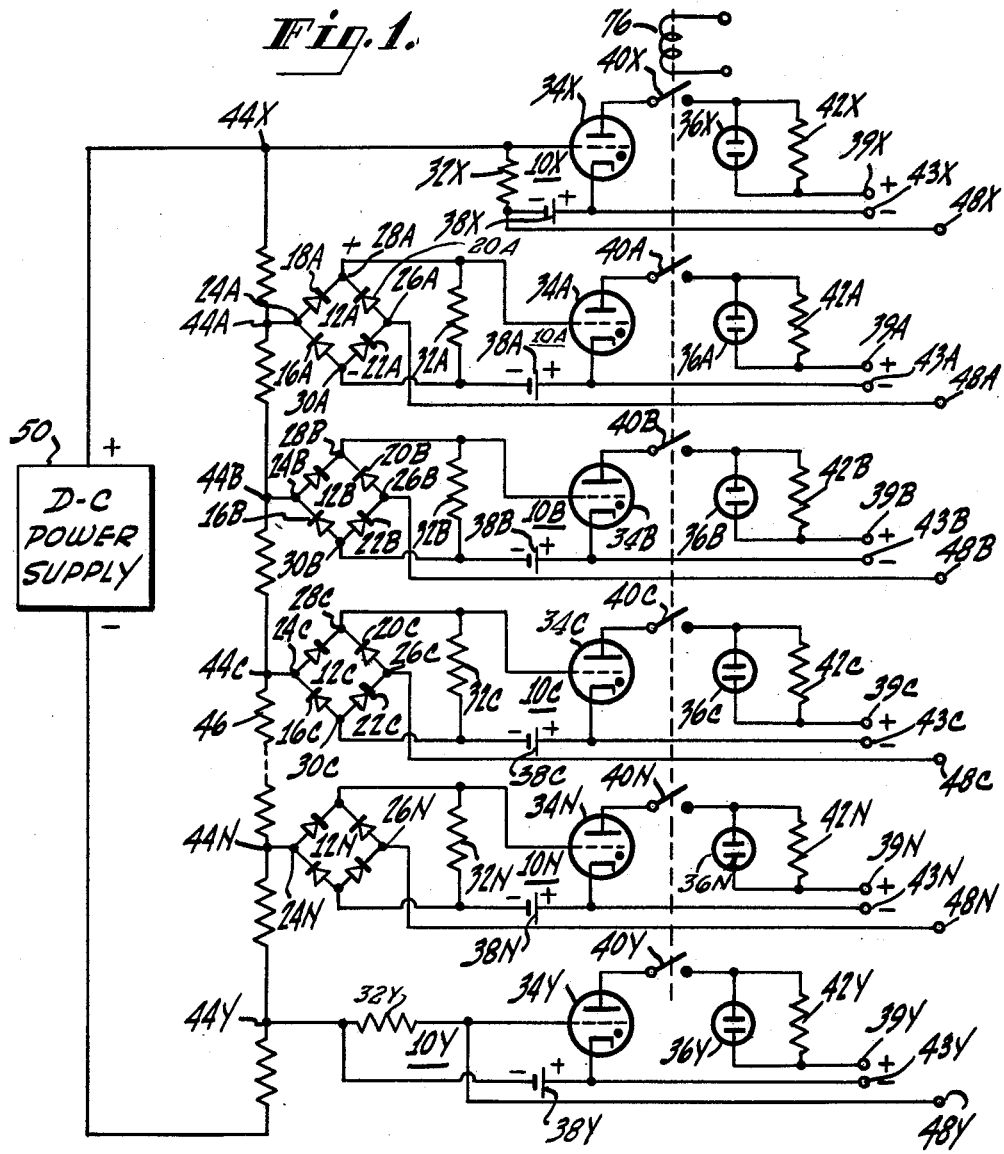

INVENTOR.
James L. Hodgdon
BY
Morris L. Rabkin
ATTORNEY

United States Patent Office 3,135,913
Patented June 2, 1964

3,135,913
APPARATUS FOR TESTING TUBES FOR ALL POSSIBLE SHORT CIRCUITS BETWEEN ELECTRODES, IN A SINGLE OPERATION
James L. Hodgdon, Plainfield, N.J., assignor to Radio Corporation of America, a corporation of Delaware
Filed Dec. 30, 1959, Ser. No. 862,872
5 Claims. (Cl. 324—21)

This invention relates generally to testing apparatus, and more particularly to apparatus for testing an assembly of normally separated, electrically conductive elements for an electrical short-circuit between two or more of the conductive elements. The testing apparatus of the present invention is particularly useful in testing electron tubes for all possible short-circuits between the electrodes of the tube, in a single operation, and for indicating simultaneously the specific electrodes that are involved in the short-circuit.

It has been proposed to test an assembly of normally separated, electrically conductive elements for a short-circuit between two or more of the elements by means of continuity testing apparatus that provides a single signal, either visual or auditory, if a short-circuit exists. Where the assembly to be tested comprises more than two electrically conductive elements, and where all of the possible continuity tests are conducted simultaneously, the derived, single signal indicating that a short exists between two or more elements does not identify the particular ones, or all, of the elements involved in the short-circuit. In testing tubes, for example, as a check on the tube manufacturing process, it is not only necessary to know if a short-circuit exists between two or more of the electrodes of the tube, but it is also necessary to identify the particular electrodes involved in the short-circuit so that the manufacturing process may be corrected accordingly. With the prior art testing apparatus, identifiable pairs of tube electrodes have to be tested sequentially in order to identify the particular electrodes involved in the short-circuit, after the testing apparatus has indicated a short-circuit in the tube.

Accordingly, it is an object of the present invention to provide improved apparatus for testing simultaneously an assembly of normally separated, electrically conductive elements for a short-circuit between two or more of the elements, and for identifying simultaneously the particular elements involved in the short-circuit.

Another object of the present invention is to provide improved apparatus for testing an electron tube for a short-circuit between two or more of the electrodes of the tube, and for indicating simultaneously the particular electrodes involved in the short-circuit.

A further object of the present invention is to provide improved electrical continuity testing apparatus that is relatively simple in construction, fast and accurate in operation, and highly efficient in use.

In accordance with the present invention, the improved testing apparatus comprises a plurality of similar circuits, each being adapted to be connected to a different, electrically conductive element in an assembly of normally separated, electrically conductive elements. Each of the similar circuits comprises a full-wave, bridge rectifier, a sensing resistor, a thyratron, and current indicating means, such as a neon lamp. One of the input terminals of each of the bridge rectifiers is connected to a unidirectional voltage divider, each to a voltage point of different amplitude from the others. The other input terminal of each of the bridge rectifiers is connected to a different element from any other in the assembly of elements to be tested for a short-circuit. In each of the similar circuits, both the input to the thyratron and the sensing resistor are connected between the output terminals of the bridge rectifier. The thyratron is biased to cut off in the absence of any current through the sensing resistor. In the event of a short-circuit between two or more of the elements in the assembly under test, current flows only in those circuits connected to the elements involved in the short-circuit. Regardless of the direction of flow of the current through the input terminals of the bridge rectifier, current always flows in the same direction through the sensing resistor in each thyratron circuit and triggers the thyratron into a conductive state. This action also triggers on the neon lamp in each of those circuits connected to the elements involved in the short-circuit, thereby indicating simultaneously the particular elements involved in the short-circuit.

Figure 2:
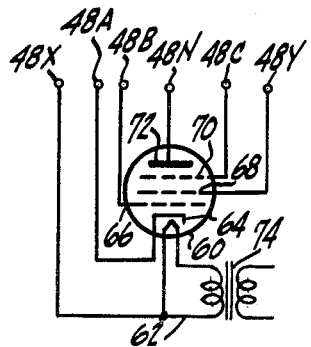

The novel features of the present invention, both as to its organization and method of operation, as well as additional objects and advantages thereof, will be understood more readily from the following description, when read in connection with the accompanying drawing in which similar reference characters represent similar parts, and in which:

FIG. 1 is a schematic diagram of testing apparatus for testing an assembly of normally separated, electrically conductive elements for a short-circuit between two or more of the elements, in accordance with the present invention; and FIG. 2 is a schematic diagram of an electron tube having six electrodes, each connected to a different terminal of the testing apparatus of FIG. 1 for testing the tube for a short-circuit between two or more of the electrodes, in accordance with the present invention.

Referring, now, more particularly to FIG. 1 of the drawing, the testing apparatus of the present invention is shown comprising a plurality of similar circuits 10A, 10B, 10C . . . 10N. Since these circuits are similar, only the circuit 10A will be described in detail. The circuit 10A comprises a full-wave, bridge rectifier 12A, which, in turn, comprises four diodes 16A, 18A, 20A, and 22A. The common junction of the cathode of the diode 16A and the anode of the diode 18A comprises one input terminal 24A of the bridge rectifier 12A. The common terminal of the cathode of the diode 22A and the anode of the diode 20A comprises another input terminal 26A of the bridge rectifier 12A. The cathode of the diode 18A is connected to the cathode of the diode 20A at a junction 28A which comprises the positive output terminal of the bridge rectifier 12A. The anodes of the diodes 16A and 22A are connected at a common junction 30A which forms the negative output terminal of the bridge rectifier 12A.

The circuit 10A also comprises a sensing resistor 32A, an electron control device, such as a thyratron 34A, and current indicating means, such as a neon lamp 36A. The input to the thyratron 34A is connected between the output terminals 28A and 30A of the bridge rectifier 12A. The input electrode, or control grid, of the thyratron 34A is connected to one end of the resistor 32A and to the positive output terminal 28A of the bridge rectifier 12A. The common electrode, or cathode, of the thyratron 34A is connected to the other end of the resistor 32A through a source 38A of bias voltage, the positive terminal of the voltage source 38A being connected to the thyratron cathode, and the negative terminal of the voltage source 38A being connected to the negative output terminal 30A of the bridge rectifier 12A. The voltage source 38A is of sufficient amplitude to cut off conduction through the thyratron 34A in the absence of any current through the sensing resistor 32A. The output electrode, or anode, of the thyratron 34A, is connected to an output terminal 39A through a normally closed reset switch 40A and the neon lamp 36A. A resistor 42A is connected across the lamp 36A. The cathode of the thyratron 34A is connected to a terminal 43A. The terminals 39A and 43A comprise means for applying a separate source of voltage (not shown) for energizing the thyratron 34A.

The input terminal 24A of the bridge rectifier 12A is connected to a tap 44A on a voltage divider 46. The input terminal 26A of the rectifier 12A is connected to a test terminal 48A for the purpose hereinafter appearing.

The components in the circuits 10B, 10C . . . 10N are similar to those in the circuit 10A and are designated by reference characters having similar reference numbers, plus reference letters corresponding to the respective circuits in which they are connected. Thus, for example, the rectifier 12B is similar to the rectifier 12A and is connected in the circuit 10B in a manner similar to the connections described for the rectifier 12A in the circuit 10A.

The input terminals 24A, 24B, 24C . . . 24N of the rectifiers 12A, 12B, 12C . . . 12N are connected to successive taps 44A, 44B, 44C . . . 44N along the voltage divider 46. The voltage divider 46 is connected to, and is energized by, a source 50 of unidirectional voltage in a manner whereby each of the taps 44A, 44B, 44C . . . 44N represents a different unidirectional voltage in a range of successively decreasing unidirectional voltages.

Each of a first circuit 10X and a last circuit 10Y of the test apparatus comprises components similar to the components used in the circuits 10A, 10B, 10C . . . 10N, except that the bridge rectifier may be omitted. The components in the circuits 10X and 10Y that are similar to the components in the circuits 10A, 10B, 10C . . . 10N are given the same reference characters except for the reference letters which refer to the particular circuits in which the components are connected. In the first circuit 10X, the sensing resistor 32X is connected, through the voltage source 38X, between the control grid and the cathode of the thyratron 34X so that the thyratron 34X is triggered on when current flows in a direction from the tap 44X on the voltage divider 46 to the test terminal 48X. In the last circuit 10Y, the sensing resistor 32Y is connected, through the bias voltage source 38Y, between the control grid and the cathode of the thyratron 34Y so as to trigger the thyratron 34Y on only when current flows in a direction from the test terminal 48Y to the tap 44Y on the voltage divider 46. It is noted that a bridge rectifier is not necessary in the circuits 10X and 10Y because current flows in only one direction in each of these circuits. Current may flow in two directions, however, in each of the similar circuits 10A, 10B, 10C . . . 10N, as will be explained hereinafter.

The operation of the test apparatus thus far described, and illustrated in FIG. 1, will now be explained in connection with an assembly of normally separated, electrically conductive elements, such as the electrodes in an electron tube 60, illustrated in FIG. 2. The tube 60 comprises the following electrodes: a filament 62, a cathode 64, a control grid 66, a screen grid 68, a suppressor grid 70, and an anode 72. In order to test the tube 60 for a short-circuit between two or more of its electrodes, each electrode is connected to a different test terminal of the test apparatus. To this end, the filament 62, the cathode 64, the control grid 66, the screen grid 68, the suppressor grid 70, and the anode 72 of the tube 60 are connected to the test terminals 48X, 48A, 48B, 48Y, 48C, and 48N, respectively, as shown in FIG. 2.

The filament 62 of the tube 60 may be heated by a separate source of voltage, as from a filament transformer 74. The tube 60 should be heated, but conduction through the tube should be cut off in order to test the tube 60 properly for a short-circuit between two or more of the tube electrodes. If the electrodes of the tube 60 are not short-circuited, no current flows in any of the circuits of the test apparatus, and none of the neon lamps will light.

Let it be assumed, for example, that there is a short-circuit between the cathode 64 and the control grid 66 of the tube 60. This short-circuit effectively connects the test terminal 48A to the test terminal 48B, and current flows from the circuit 10A to the circuit 10B. Starting at the highest point of voltage in the circuit 10A, conventional current flows from the voltage tap 44A in the circuit 10A to the voltage tap 44B in circuit 10B through the following components, in the order named: the input terminal 24A, the diode 18A, the positive output terminal 28A, the sensing resistor 32A, the positive output terminal 30A, the diode 22A, the input terminal 26A, the test terminal 48A, the test terminal 48B, the input terminal 26B, the diode 20B, the positive output terminal 28B, the sensing resistor 32B, the negative output terminal 30B, the diode 16B, the input terminal 24B, and the voltage tap 44B. Current through the sensing resistors 32A and 32B triggers on the thyratrons 34A and 34B which, in turn, cause the neon lamps 36A and 36B to light. Thus, a short-circuit between the electrodes connected to the test terminals 48A and 48B causes neon lamps 36A and 36B to light, thereby indicating the particular electrodes involved in the short-circuit.

Let it now be assumed that, in addition to a short-circuit between the cathode 64 and the control grid 66 in the tube 60, a short-circuit also exists between the cathode 64 and the suppressor grid 70. Since the suppressor grid 70 is connected to the test terminal 48C, current will flow from the circuit 10A to the circuit 10C and cause the neon lamps 36A and 36C to light. The direction of conventional current from the circuit 10A to the circuit 10C will be along the following path, in the order named: the voltage tap 44A, the input terminal 24A, the diode 18A, the positive output terminal 28A, the sensing resistor 32A, the negative output terminal 30A, the diode 22A, the input terminal 26A, the test terminal 48A, the test terminal 48C, the input terminal 26C, the diode 20C, the positive output terminal 28C, the sensing resistor 32C, the negative output terminal 30C, the diode 16C, the input terminal 24C, and the voltage tap 44C. Here, again, current flowing through the sensing resistor 32C, from the positive output terminal 28C to the negative output terminal 30C, triggers on the thyratron 34C and causes the neon lamp 36C to light. The neon lamps 36A and 36B also light, simultaneously with the lighting of the neon lamp 36C, to indicate that the electrodes connected to the test terminals 48A, 48B, 48C are involved in a short-circuit.

Let it now be assumed that only the control grid 66 and the suppressor grid 70 of the tube 60 are involved in a short-circuit. In this example, the test terminal 48B is connected to the test terminal 48C, through the short-circuit in the tube 60, and conventional current flows from the voltage tap 44B, through the circuit 10B, and then through the circuit 10C, to the voltage tap 44C. It is noted that, in this last example, current in the circuit 10B flows from the voltage tap 44B to the test point 48B, whereas, in the first example given herein, the current flowed in the opposite direction. Regardless of the direction of current supplied to the input terminals 24B and 26B of the rectifier 12B, however, the current through the sensing resistor 32B is always from the positive output terminal 28B to the negative output terminal 30B of the rectifier 12B. This action always causes the neon lamp 36B to light, regardless of the direction of the current in the circuit. Thus, a short-circuit between the electrodes connected to the terminals 48B and 48C causes current to flow in the circuits 10B and 10C. This action triggers on the thyratrons 34B and 34C and causes neon lamps 36B and 36C to light, specifically identifying the control grid 66 and the suppressor grid 70 as the electrodes of the tube 60 involved in the short-circuit.

If a short-circuit exists between the test terminals 48X and 48Y, as when the filament 62 is short-circuited to the screen grid 68, current flows from the circuit 10X to the circuit 10Y. Since the voltage tap 44X is at a higher unidirectional potential than the voltage tap 44Y, current always flows from the circuit 10X to the circuit 10Y, that is, current always flows in only one direction in the first and last circuits 10X and 10Y. Because of this fact, a full-wave bridge rectifier is not necessary in the circuits 10X and 10Y. In the remaining circuits 10A, 10B, 10C . . . 10N of the test apparatus, however, current may flow in either of two directions, depending upon the elements involved in the short-circuit. Hence, a full-wave, bridge rectifier is necessary in each of these similar circuits to cause current to flow in only one direction in the sensing resistor in each circuit. This action triggers the appropriate thyratron and actuates the associated current sensing means (that is, the neon lamp) regardless of the direction of current flow.

After the thyratrons in the test apparatus have been fired, they remain conductive, and their corresponding neon lamps remain lighted, until the sources of operating voltage are removed from the thyratrons. The voltage sources are removed from the thyratrons by momentarily opening the normally closed, reset switches in the anode circuits of the thyratrons. A relay switch coil 76, adapted to be energized from any suitable voltage source (not shown), is disposed to actuate the switches 40X, 40A, 40B, 40C . . . 40N and 40Y simultaneously, to open and close these switches, before any new short-circuit test is begun. Momentarily energizing the relay switch coil 76 readies the test apparatus so that only the neon lamps that are lighted in a subsequent short-circuit test indicate the specific elements involved in the short-circuit.

From the foregoing description, it will be apparent that there has been provided improved testing apparatus for testing an assembly of normally separated, electrically conductive elements for a short-circuit between two or more of the elements, and for identifying specifically each of the elements involved in the short-circuit. While the testing apparatus of the present invention has been described and illustrated in connection with the testing of short-circuits between electrodes in an electron tube, it will be understood that complex assemblies of all types of electrical apparatus may be tested for short-circuits by connecting the test points of the testing apparatus to the elements of the assembly that are supposed to be electrically separated from each other. Thus, while only one embodiment of the invention has been described, various components useful therein, as well as variations coming within the spirit of this invention, will, no doubt, readily suggest themselves to those skilled in the art. Hence, it is desired that the foregoing shall be considered merely as illustrative and not in a limiting sense.

What is claimed is:

1. In apparatus of the type wherein each of a plurality of similar thyratron circuits, normally biased to cut off, has a sensing resistor connected in the input means of each thyratron to trigger said thyratron on when current flows through said sensing resistor, a source of unidirectional voltages of different amplitudes, a full-wave bridge rectifier for each circuit having two input terminals and two output terminals, means connecting each of said sensing resistors between said two output terminals of a different on of said rectifiers, and means connecting one input terminal of said two input terminals in each of said circuits to a different voltage of said source, whereby current will flow through at least two of said circuits when at least two of the other of said two input terminals are electrically connected to each other.

2. In apparatus of the type wherein each of a plurality of similar thyratron circuits, normally biased to cut off, has a sensing resistor connected in the input means of each thyratron to trigger said thyratron on which current flows through said sensing resistor, a voltage divider, means to apply a source of unidirectional voltage across said voltage divider, a full-wave bridge rectifier for each circuit having two input terminals and two output terminals, means connecting each of said sensing resistors between said two output terminals of a different one of said rectifiers, means connecting one input terminal of said two input terminals in each of said circuit to a different tap on said voltage divider, whereby current will flow through at least two of said circuits when at least two of the other of said two input terminals are electrically connected to each other, and current indicating means connected in each of said thyratron circuits to indicate which of said circuits are conducting.

3. Apparatus for testing normally separated, electrically conductive elements for a short-circuit between two or more of said elements, said apparatus comprising a plurality of similar circuits, each of said circuits comprising a full-wave bridge rectifier having a pair of input terminals and a pair of output terminals, a sensing resistor, an electron control device having an input electrode, an output electrode, and a common electrode, current indicating means, means connecting said input electrode to one end of said sensing resistor and to one of said output terminals, means connecting said common electrode to the other end of said sensing resistor and to the other of said output terminals, at least one of said last-two-mentioned means comprising means to bias said device to cut off in the absence of current through said sensing resistor, means to connect a source of voltage in series with said common electrode, said current indicating means, and said output electrode, means to connect one of said input terminals to one of said elements, a source of voltages of different amplitudes, and means connecting the other of said input terminals of each of said circuits to a voltage of different amplitude of said last-mentioned source.

4. Apparatus for testing an assembly of normally separated, electrically conductive elements for a short-circuit between two or more of said elements, said apparatus comprising a plurality of similar circuits, each of said circuits comprising a full-wave bridge rectifier having a pair of input terminals and a pair of output terminals, a sensing resistor, a thyratron having a control grid, an anode, and a cathode, current indicating means, means connecting said control grid to one end of said sensing resistor and to one of said output terminals, means connecting said cathode to the other end of said sensing resistor and to the other of said output terminals, at least one of said last-two-mentioned means comprising means to bias said thyratron to cut off in the absence of current through said sensing resistor, means to connect a source of voltage in series with said cathode, said current indicating means, and said anode, means to connect one of said input terminals to one of said elements of said assembly, a source of unidirectional voltages of different amplitudes, and means connecting the other of said input terminals of each of said circuits to a voltage of different amplitude of said last-mentioned source.

5. Apparatus for testing an assembly of normally separated, electrically conductive elements for a short-circuit between two or more of said elements, said apparatus comprising a plurality of similar circuits, each of said circuits comprising a full-wave bridge rectifier having a pair of input terminals and positive and negative output terminals, a sensing resistor, an electron control device having an input electrode, an output electrode, and a common electrode, a lamp, means connecting said input electrode to one end of said sensing resistor and to said positive output terminal, means connecting said common electrode to the other end of said sensing resistor and to said negative output terminal, said last-mentioned means comprising means to bias said device to cut off in the absence of current through said sensing resistor, means to connect a source of voltage in series with said common electrode, said lamp, and said output electrode, means to connect one of said input terminals to one of said elements of said assembly, a voltage divider, means to connect a source of unidirectional voltage across said voltage divider, and means connecting the other of said input terminals of each of said circuits to successive taps along said voltage divider.

References Cited in the file of this patent

UNITED STATES PATENTS

| | | |
|---|---|---|
| 2,088,494 | Sewedlund | July 27, 1937 |
| 2,434,947 | Meszaros et al. | Jan. 27, 1948 |
| 2,492,733 | Burchell | Dec. 27, 1949 |
| 2,989,682 | Hagensick et al. | June 20, 1961 |
| 3,032,708 | Wise | May 1, 1962 |

OTHER REFERENCES

Checker for Intermittent Tube Shorts, by George W. Cotter, Radio and TV News, April 1958, pages 116–117.